May 21, 1968     H. W. KOST     3,384,141

COMPOSITE SCREW

Filed July 8, 1966

INVENTOR.
HAROLD W. KOST

BY *Lindsey Prutzman and Hayes*
ATTORNEYS

United States Patent Office
3,384,141
Patented May 21, 1968

3,384,141
COMPOSITE SCREW
Harold W. Kost, Suffield, Conn., assignor to Connecticut International Corporation, Windsor Locks, Conn., a corporation of Connecticut
Filed July 8, 1966, Ser. No. 563,857
7 Claims. (Cl. 151—7)

ABSTRACT OF THE DISCLOSURE

A composite fastener comprising a one-piece metal core having a shank and a flat head radially extending in perpendicular relation to the shank, and a tensioned shell of molded plastic material surrounding and compressively engaging the core. The shell shown in FIGS. 1 and 2 includes a molded compressible unthreaded neck portion extending under the head of the core which reinforces the neck portion for effecting a fluid tight seal with a surface surrounding a mating threaded opening at a juncture of the neck portion with molded threads formed on the shell surrounding the core shank, said juncture being in axially spaced relation to the head of the core. The modified form of the fastener shown in FIG. 2 features a neck portion having a fillet for sealing the opening, and the thread profile construction of FIG. 4 provides a fluid seal between the fastener threads and the threaded opening.

This invention generally relates to threaded fasteners and has as a primary object the provision of an improved composite threaded fastener having a metal core embedded in a molded plastic providing a rugged unitary construction which is economical to manufacture.

Another object of the invention is to provide an improved composite screw having a one-piece metal core and a tensioned shell of molded plastic surrounding and compressively engaging the core. Included in this object is the aim of providing a shell having a molded unthreaded neck portion extending under a flat radial head of the core and molded threads spaced apart therefrom by the molded neck portion to provide an improved composite screw of significantly increased strength and which is specifically designed to maintain the metal and plastic components in assembled relation under high working stresses.

A further object of the invention is to provide a self-locking composite screw of the above-described type having materially improved shear and torque strength and which exhibits increased compressive holding force to resist disassembly under high shock and vibrational loading while at the same time significantly minimizing any tendency of the plastic threads to be peeled or otherwise separated from the metal core.

Still another object of the invention is to provide an improved composite screw having a thread construction which is essentially self-sealing to prevent any fluid leakage between the fastener and its mating threaded opening.

Other objects will be in part obvious and in part pointed out more in detail hereinafter.

The invention accordingly consists in the features of construction, combination of elements and arrangements of parts which will be exemplified in the construction hereafter set forth, and the scope of the application of which will be indicated in the appended claims.

Figure 1:
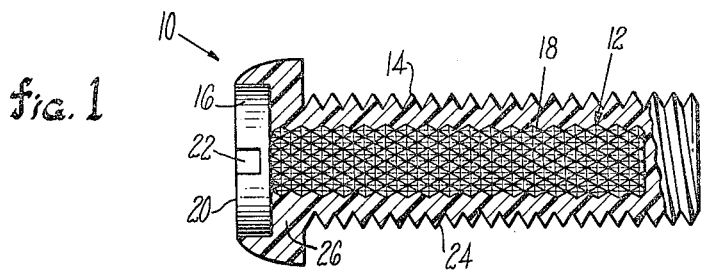
FIG. 1 is a side view, partly broken away and partly in section, showing a composite screw constructed in accordance with the present invention.

Referring now to the drawing in detail and more particularly to that embodiment of the invention shown in FIG. 1, a threaded fastener or screw 10 is shown having a one-piece metal core 12, formed of any suitable metallic material, surrounded by a shell 14 of resilient compressible plastic. The metal core 12 comprises an enlarged head 16 and a shank 18 of reduced cross section integrally formed therewith and depending axially from the head 16. The shell 14 completely surrounds the metal core 12 except for an exposed upper end 20 of its head 16 shown having a tool receiving slot 22.

To firmly secure the shell 14 to the metal core 12, the shell 14 is molded around the metal core 12, and suitable dies are provided for forming molded plastic threads 24 along a portion of the shell 14 overlying the shank 18. The shank 18 has a rough irregular surface formed by a multiplicity of ridges and grooves giving rise to a knurl effect shown in FIG. 1. As the molded plastic shell 14 solidifies and cures, the plastic material shrinks and compressively engages the metal core 12 in tight-fitting surface-to-surface engagement over all contiguous surfaces whereby complementary ridges and grooves are formed in the shell 14 exactly matching and interengaging those of the shank 18.

By virtue of this construction, intimate frictional contact is effected between the metal core 12 and the shell 14 to provide a self-locking high strength unit having significantly improved resistance to torque loading. Moreover, a circumferential tensile stress or "hoop" tension is set up within the shell 14 to firmly lock the metal core 12 within the tensioned plastic shell 14 such that torsional forces are effectively transmitted between the two interengaging elements while at the same time minimizing any possibility of the metal core 12 becoming loosened within its shell 14. The increased torsional strength of the screw 10 is aided by a mass of unthreaded plastic constituting an enlarged neck portion 26 extending under the head 16 and around its peripheral edges such that greater strength is effected for withstanding a predetermined working stress. Although the dimensioning of the neck portion 26 will vary, e.g., in accordance with the compressive strength of the plastic which is used, the axial length of the neck portion 26 under the head 16 preferably is not less than the pitch of the molded plastic threads 24 so as to minimize any tendency of the threads peeling upon being tightly seated in a mating threaded opening. A further advantage of this construction resides in the fact that the molded plastic threads 24 are economically and easily formed while at the same time ensuring a uniform thread construction throughout the length of the threaded portion of the shell 14.

Various thermoplastics may be used for the shell 14, including cellulose acetate, cellulose butyrate, polyethylene, polypropylene, polystyrene, acrylic-butadienestyrene copolymer, polyamides such as nylon, acetals such as "Delrin," polysulfone and polyphenylene oxide or similar plastic materials having additives to impart further desired characteristics not present in base plastic matreial. In practice, nylon has been found highly satisfactory and is preferred because of its combination of various properties.

Figure 2:
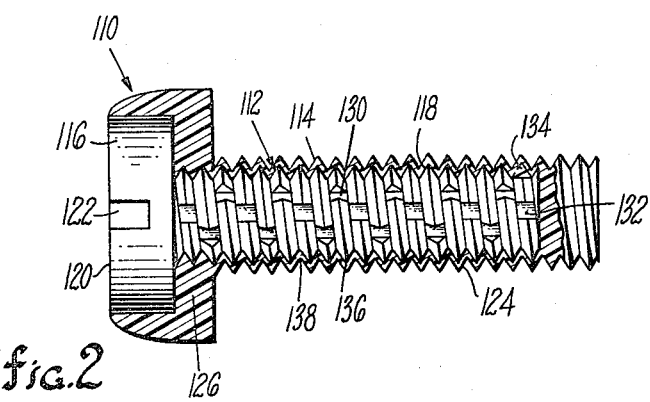
FIG. 2 is a side view, partly broken away and partly in section, showing another embodiment of a composite screw according to the present invention.
Figure 3:
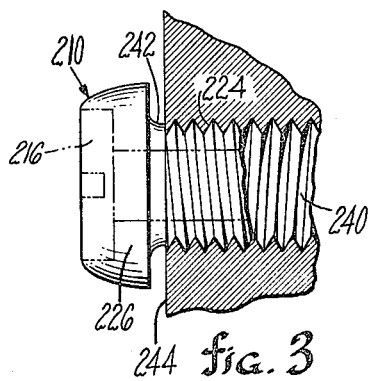
FIG. 3 is a partial side view showing still another embodiment of a composite screw according to the present invention.

In the other embodiments of the invention illustrated in FIGS. 2 and 3, the same numerals with different prefixes have been utilized to identify like parts. In general, the screw 110 shown in FIG. 2 comprises a metal core 112 and a plastic molded shell 114 similar to that described in connection with the first embodiment. However, in the embodiment of FIG. 2 the interlocking of the metal core 112 and the tensioned plastic shell 114 is materially improved by the formation of interrupted external threads 130 on the shank 118 of the metal core 112. Interruptions 132 in the threads 130 provide recesses in the metal shank 118 for receiving protuberances as at 134 projecting inwardly from the overlying shell 114. The protuberances are embedded and compressively engaged within the interruptions 132 due to the above-mentioned shrinkage of the molded plastic shell 114 to positively lock the same to the metal core 112.

The second embodiment shown in FIG. 2 has the additional advantage of increased shear strength for preventing relative rotation and separation of the metal core 112 and the shell 114. The pitch of the metal core threads 130 is substantially equal to that of the molded plastic threads 124 and the thread profile of the latter is aligned with and exactly matches that of the underlying threads 130, whereby the molded plastic threads 124 are effectively strengthened. For maximum reinforcement, the thread crests 136 on the metal core 112 project radially outwardly of the adjacent thread roots 138 on the shell 114 to provide a composite screw of high shear strength which also exhibits added tensile strength to minimize any elongation of the plastic threads upon being driven into a threaded opening. As in the first embodiment, it will be noted that the unthreaded neck portion 126 of the screw 110 is relatively thick whereby the plastic threads 124 terminate well below the bottom of the metal head 116 and are spaced therefrom to provide a composite fastener of increased torque strength.

In accordance with another form of the present invention, FIG. 3 illustrates a third embodiment of a composite screw 210 which eliminates or minimizes any possibility of the molded plastic threads 224 being peeled off the metal core 212 as the screw 210 is being twisted into or removed from a mating threaded opening 240. It has been found that the provision of an unthreaded portion having an axial length of about 1/64 to 1/16 inch at the juncture between the upper end of the plastic threads 224 and the bottom of the neck portion 226 significantly reduces any tendency of peeling off the plastic threads 224 upon driving the screw 210 into its threaded opening 240. More specifically, an annular fillet 242 is shown in FIG. 3 underlying the bottom of the neck portion 226 and which preferably has a maximum diameter approximately 30 to 40 mils greater than the diameter of the hole whereby the fillet 242 effects an abutment engageable with a surface 244 surrounding the threaded opening 240. This structure provides the added advantage of effectively sealing the threaded opening 240 which is of paramount importance in certain applications such as when used in sealing a liquid container. As pointed out above, the elimination of thread peeling is assisted by the enlarged neck portion 226 underlying the metal head 216, the diameter of the head 216 being greater than the major diameter of the threaded portion of the shell 224.

Figure 4:
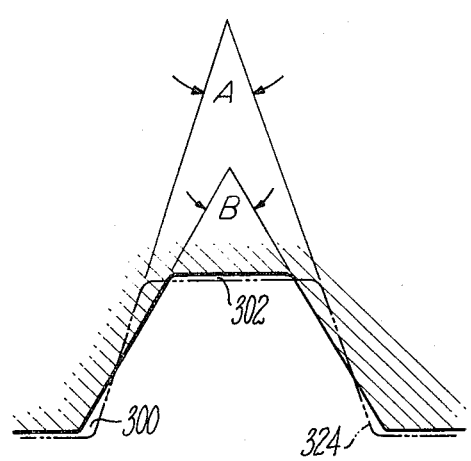
FIG. 4 is an enlarged section view, partly broken away, showing in broken lines a thread profile of a composite screw and, in full lines, a partial thread profile of a mating threaded opening.

Another aspect of the present invention is illustrated in FIG. 4 wherein it will be understood that the broken lines represent a molded plastic thread profile of a fastener of the above described type which is different from the thread form of its mating threaded opening, the internal threads of which are shown in full lines and will be understood to be made of a suitable metal. The depth of the plastic thread 324 is substantially equal to the depth of the groove formed in its internally threaded opening. However, the thread angle A of the plastic thread form is less than the included angle B of the corresponding groove of the threaded opening. The molded plastic threads thus are specifically designed to effect a high plastic-to-metal thread friction such that upon being driven into the threaded opening, the cold flow characteristics of the resilient compressible plastic threads 324 will completely and compressively fill voids 300 and 302 created by the difference in thread profiles adjacent the roots and crests of the threaded opening to provide a self-locking and self-sealing thread construction for eliminating fluid leakage past the mating threaded elements.

A composite fastener of the above-described structure provides strength and durability approaching that of a solid metal fastener while at the same time exhibiting the advantages of plastic in resisting corrosion, vibrational and shock loading and electrical conductivity. In addition, such advantageous features are incorporated in an economical self-locking and self-sealing fastener particularly suited for reliable use under rugged operating conditions.

As will be apparent to persons skilled in the art, various modifications and adaptations of the structure above-described will become readily apparent without departure from the spirit and scope of the invention, the scope of which is defined in the appended claims.

I claim:

1. A composite threaded fastener insertable into a mating threaded opening and comprising a one-piece metal core having a head and a shank of reduced cross-section relative to said head depending axially therefrom, said head having a flat configuration radially extending in perpendicular relation to said shank, and a tensioned shell of molded plastic material surrounding and compressively engaging said core, said shell having a molded unthreaded neck portion, extending under said head and around its peripheral edges leaving only an exposed upper end on said head having tool receiving means provided thereon, said shell being in tight-fitting surface-to-surface engagement with said metal core due to shrinkage of said shell, said shell and said shank having juxtaposed surfaces with interengaging self-locking ridges and grooves in intimate contact over all contiguous surfaces, said shell having molded threads formed on an outside portion of said shell surrounding said shank of said metal core, and said molded threads terminating at a juncture with said molded unthreaded neck portion, said juncture being axially spaced from said head of said core providing a compressible plastic abutment underlying said head of said core and engageable with a surface around a mating threaded opening for sealing the same and preventing peeling of said molded threads on said shell.

2. The composite threaded fastener of claim 1 wherein said ridges and grooves of said shank of said metal core are formed by external threads of substantially the same pitch as said molded threads, said molded threads having their thread profile aligned with and matching that of said external threads whereby the latter reinforce said shell and provide a composite fastener of increased shear strength.

3. The composite threaded fastener of claim 2 wherein the thread crests on said shank project radially outwardly of the thread roots on said shell.

4. The composite threaded fastener of claim 1, wherein said unthreaded neck portion of said shell has an axial length not less than the pitch of said molded threads on said shell.

5. The composite threaded fastener of claim 1 wherein said unthreaded neck portion includes an annular fillet having a maximum diameter approximately 30 to 40 mils greater than its mating threaded opening and an axial length of about 1/64 to 1/16 inch.

6. In combination, a surface having an internally threaded opening formed therein, and a composite threaded fastener comprising a one-piece metal core having a head and an integral shank of reduced cross-section relative to said head received in the threaded opening, and a tensioned shell of molded plastic material surrounding and compressively engaging said shank and extending under said head and around its peripheral edges leaving only an exposed upper end on said head having tool receiving means provided thereon, said shell being in tight-fitting surface-to-surface engagement with said metal core due to shrinkage of said shell, said shell and said shank having juxtaposed surfaces with interengaging self-locking ridges and grooves in intimate contact over all contiguous surfaces, said shell having molded threads formed on an outside portion of said shell surrounding said shank of said metal core and engaging said internally threaded opening, the depth of said molded threads on said shell being substantially equal to the thread depth of the threaded opening, and the thread angle of said molded threads on said shell being less than that of the threaded opening such that, upon being inserted therein, said molded threads on said shell cold flow to completely and compressively fill any voids thereby to provide a self-sealing thread construction.

7. A composite threaded fastener insertable into a mating threaded opening and comprising a one-piece metal core having a head and a shank of reduced cross-section relative to said head depending axially therefrom, an a tension shell of molded plastic material surrounding and compressively engaging said shank and extending under said head and around its peripheral edges leaving only an exposed upper end on said head having tool receiving means provided thereon, said shell being in tight-fitting surface-to-surface engagement with said metal core due to shrinkage of said shell, said shell and said shank having juxtaposed surfaces with interengaging self-locking ridges and grooves in intimate contact over all contiguous surfaces, said shell having molded threads formed on an outside portion of said shell surrounding said shank of said metal core, said ridges and grooves of said shank of said metal core being formed by external threads of substantially the same pitch as said molded threads, said molded threads having their thread profile aligned with and matching that of said external threads whereby the latter reinforce said shell and provide increased shear strength, and said ridges and grooves of said shank including interruptions formed in its said external threads providing recesses therein, said ridges and grooves of said shell having inwardly projecting protuberances embedded and compressively engaged within said recesses for positively locking said shell to said metal core.

References Cited

UNITED STATES PATENTS

| | | | |
|---|---|---|---|
| 2,377,405 | 6/1945 | Davies | 151—14 |
| 2,432,986 | 12/1947 | Forman. | |
| 2,686,342 | 8/1954 | D'Eustachio. | |
| 2,832,391 | 4/1958 | Clark | 151—7 |
| 2,890,845 | 6/1959 | Kiekhaefer. | |
| 3,133,578 | 5/1964 | Moskovitz | 151—22 |

FOREIGN PATENTS 997,733   7/1965   Great Britain.

CARL W. TOMLIN, *Primary Examiner.*

RAMON S. BRITTS, *Assistant Examiner.*